I. A. HARDY.
CIGAR BANDING MACHINE.
APPLICATION FILED MAY 22, 1919.

1,409,375.

Patented Mar. 14, 1922.
11 SHEETS—SHEET 1.

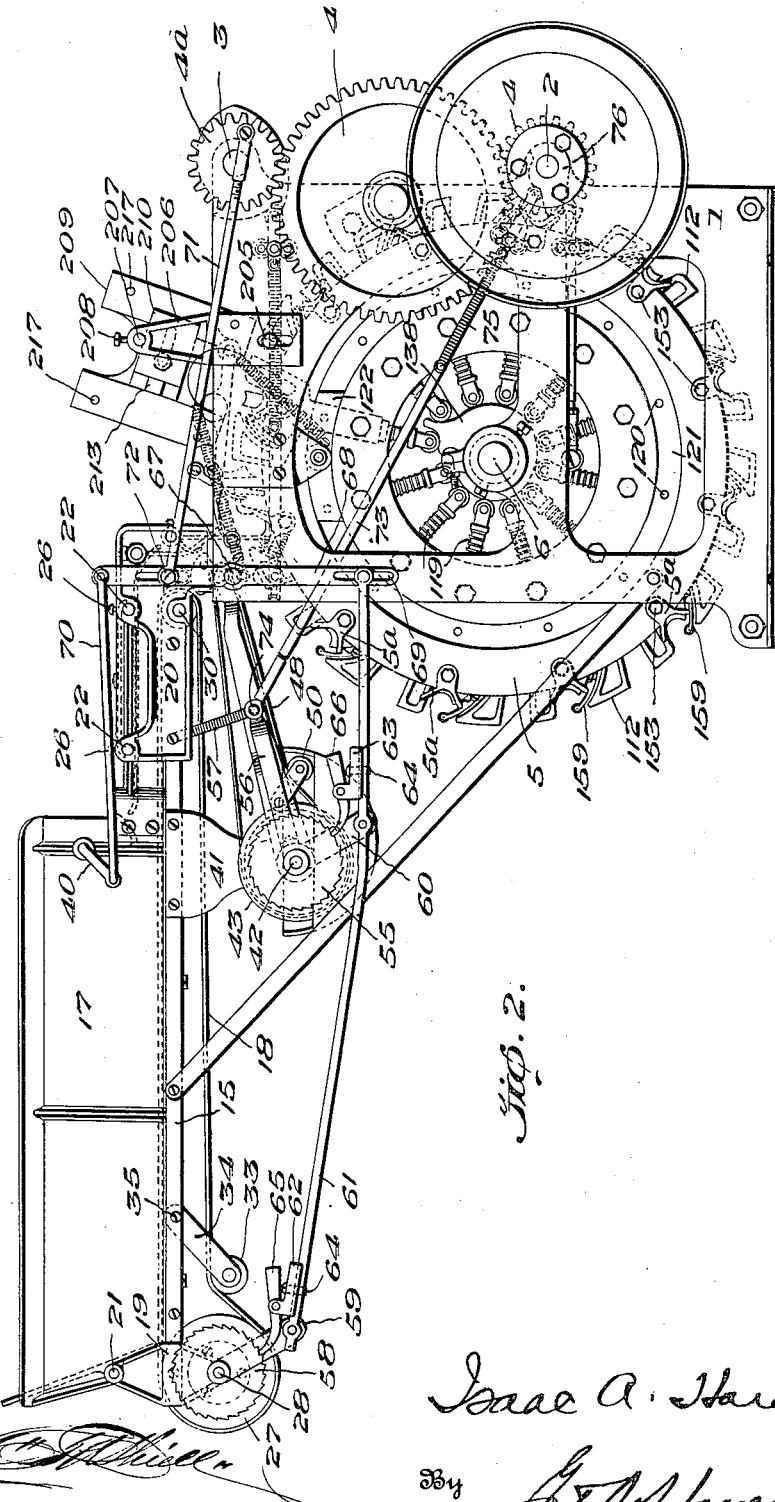

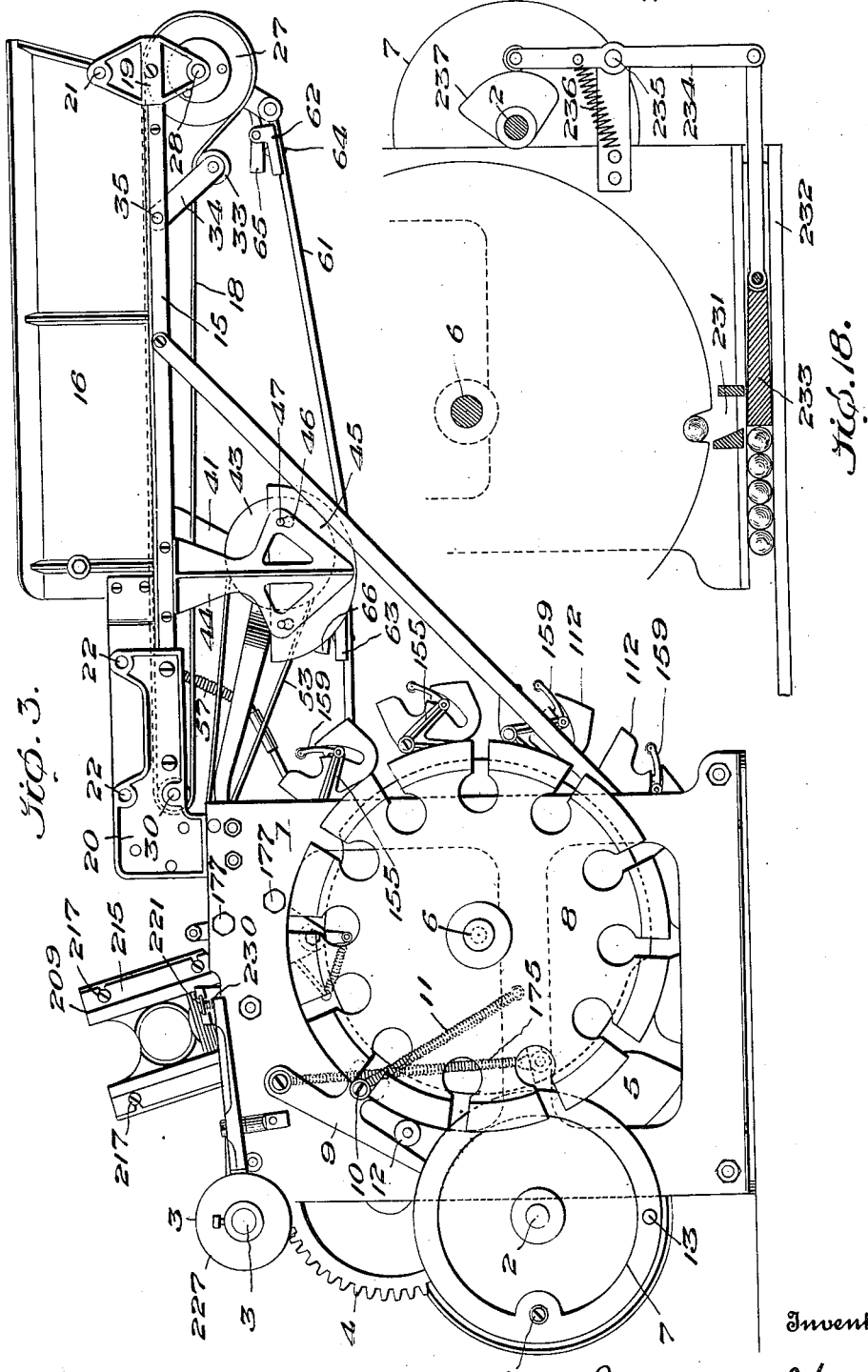

I. A. HARDY.
CIGAR BANDING MACHINE.
APPLICATION FILED MAY 22, 1919.

1,409,375.
Patented Mar. 14, 1922.
11 SHEETS—SHEET 4.

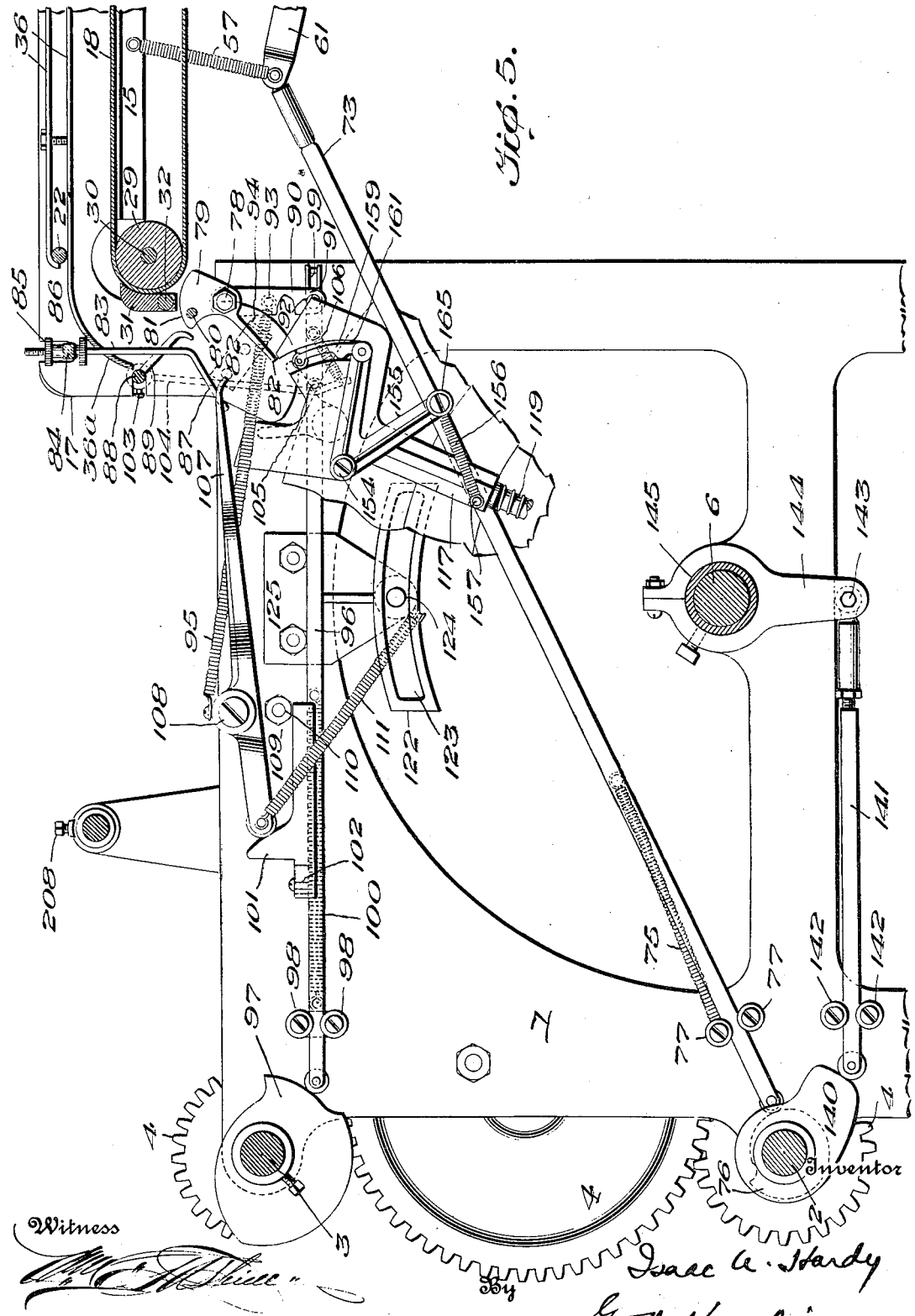

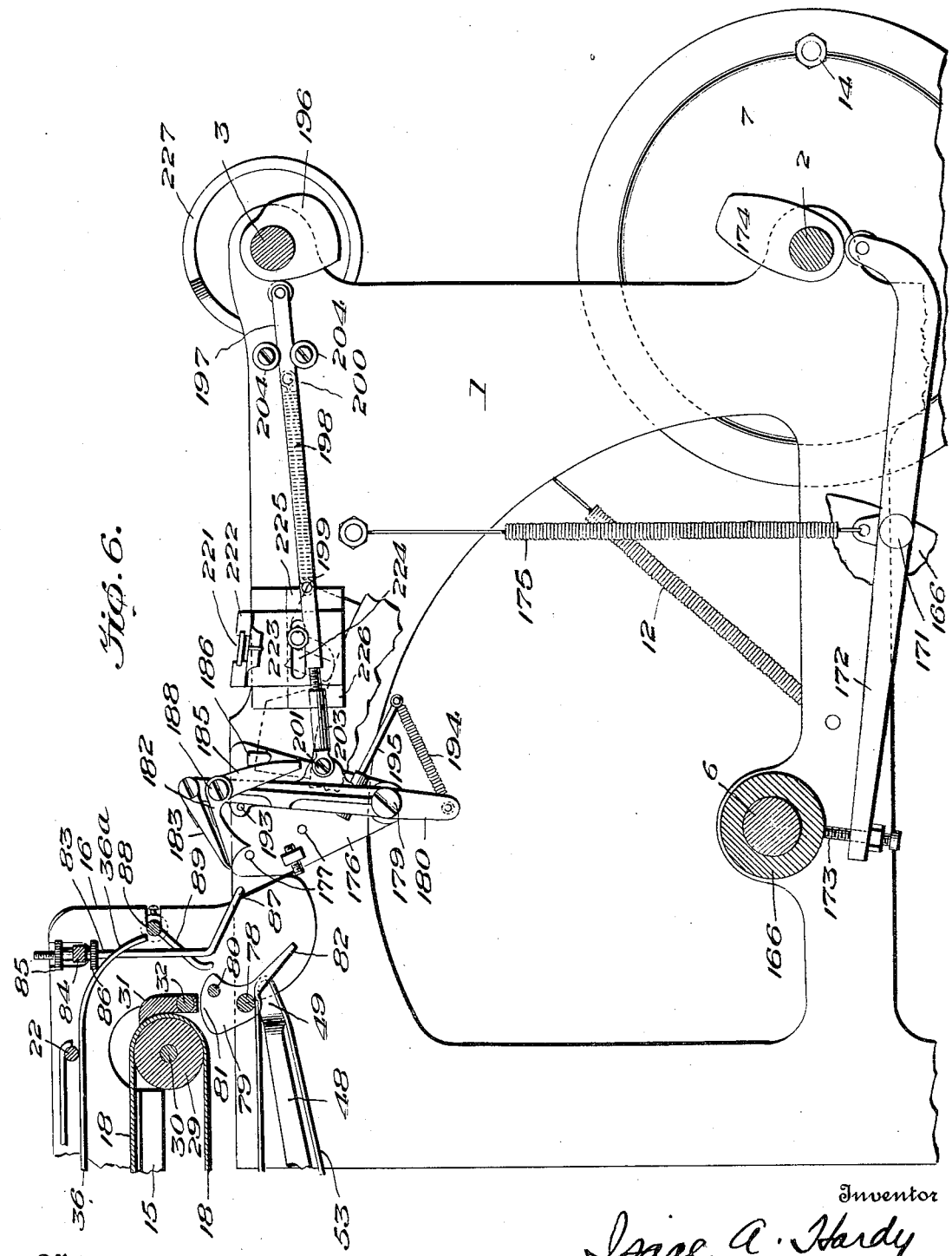

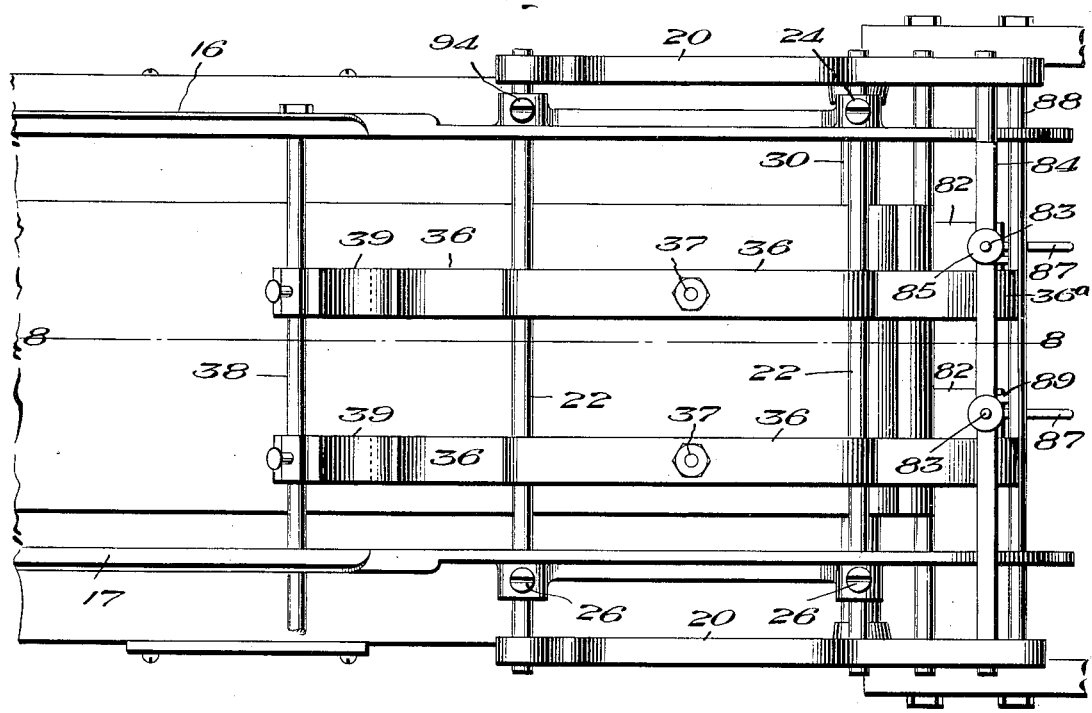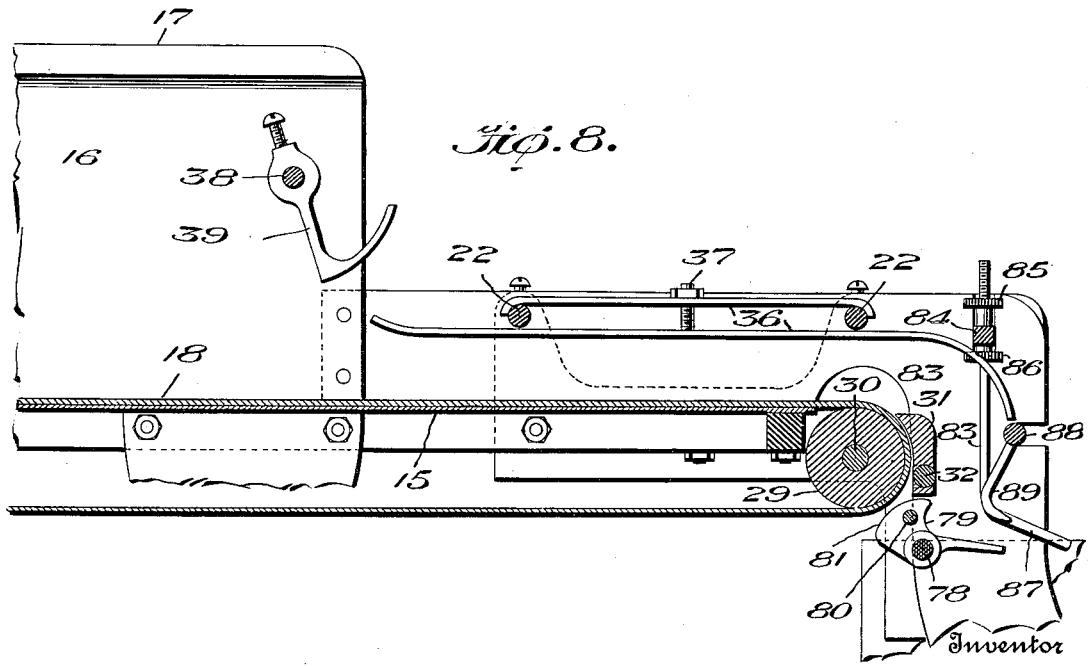

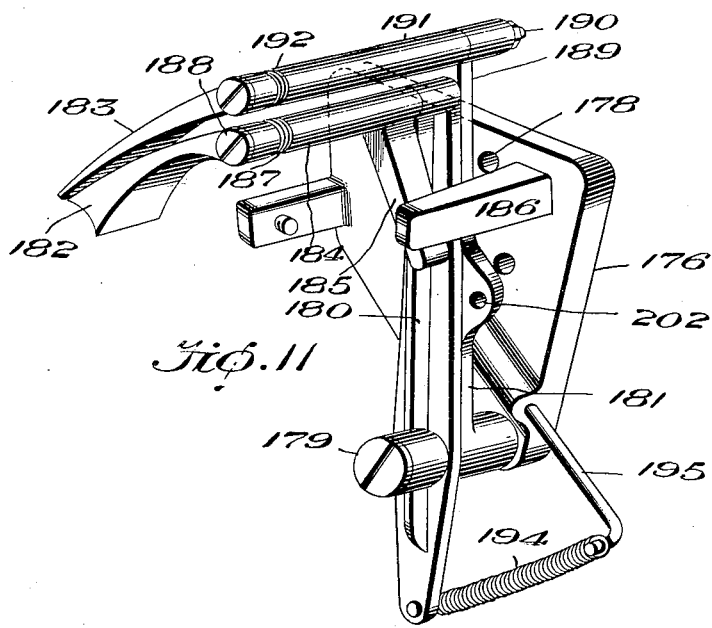
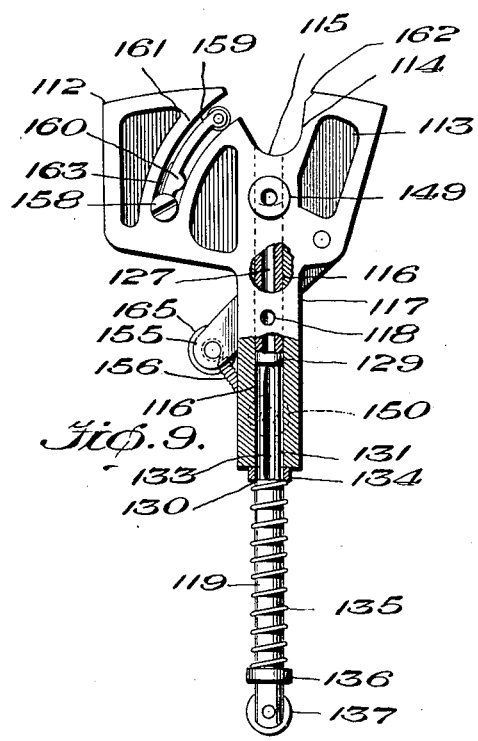
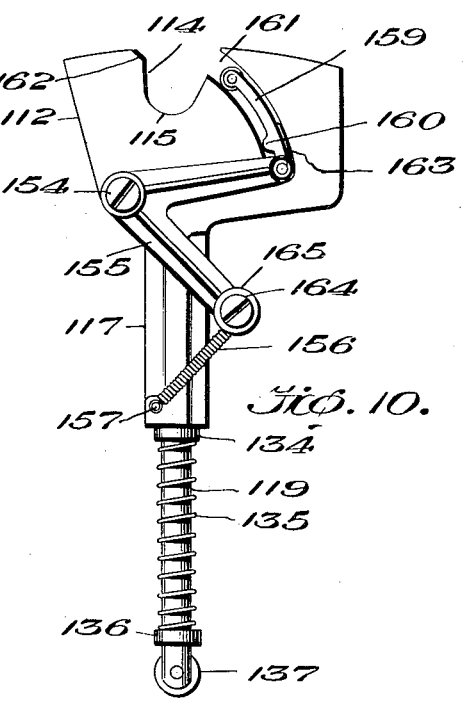

I. A. HARDY.
CIGAR BANDING MACHINE.
APPLICATION FILED MAY 22, 1919.

1,409,375.

Patented Mar. 14, 1922.
11 SHEETS—SHEET 9.

Witness

Inventor
Isaac A. Hardy
By
Attorney

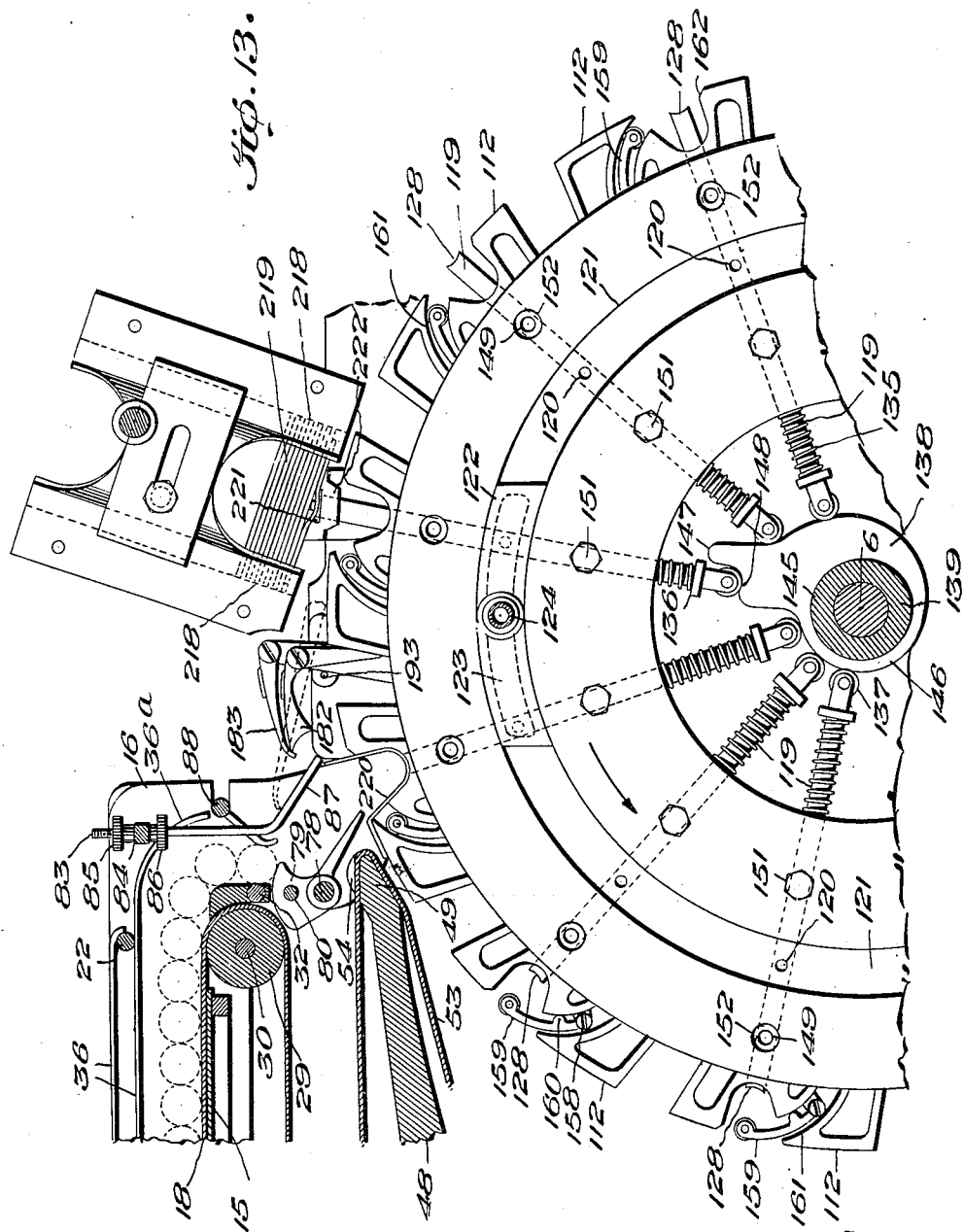

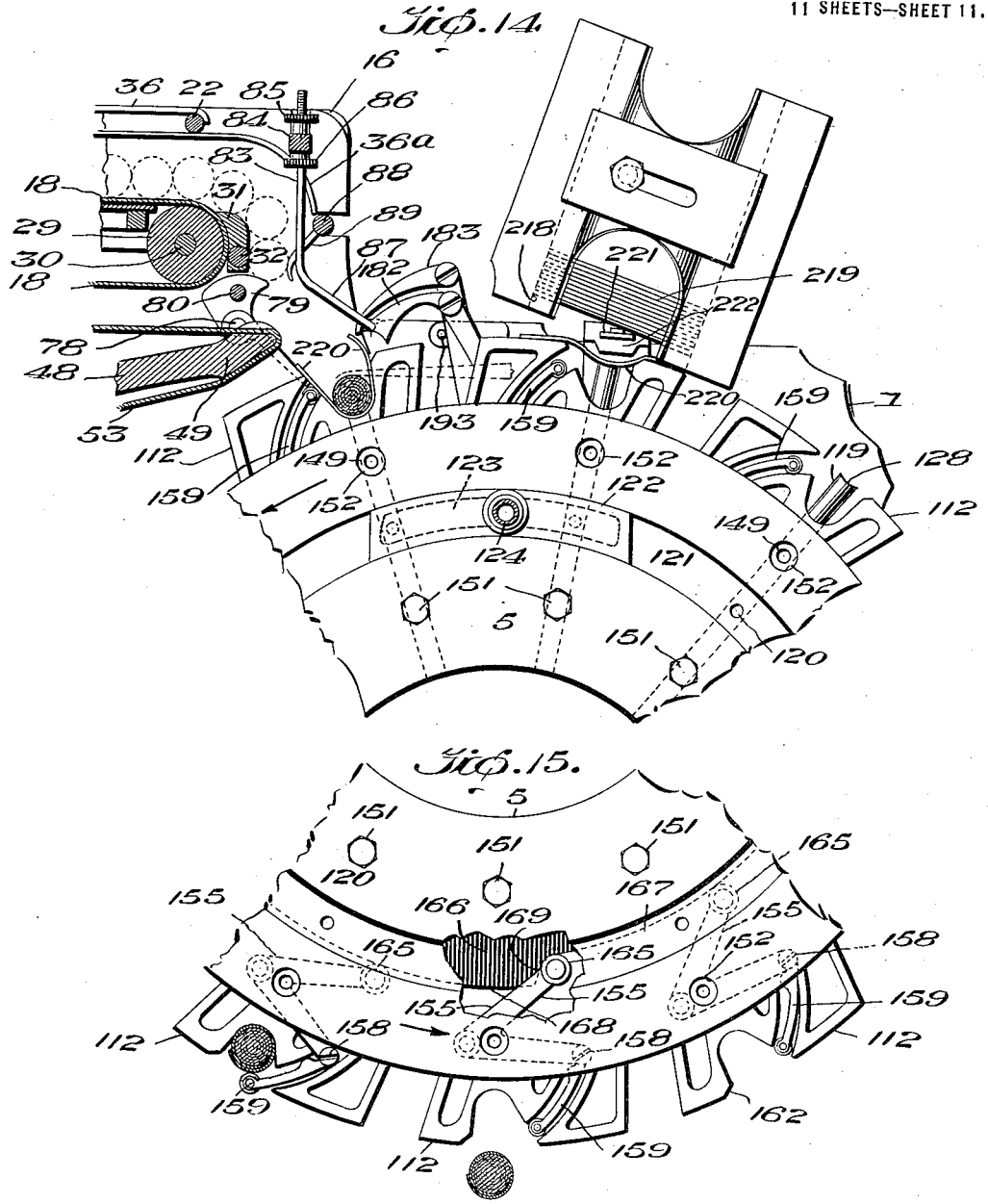

UNITED STATES PATENT OFFICE.

ISAAC A. HARDY, OF EVANSVILLE, INDIANA.

CIGAR-BANDING MACHINE.

1,409,375.　　　　　Specification of Letters Patent.　　Patented Mar. 14, 1922.

Application filed May 22, 1919. Serial No. 298,845.

*To all whom it may concern:*

Be it known that I, ISAAC A. HARDY, a citizen of the United States, residing at Evansville, in the county of Vanderburg and State of Indiana, have invented certain new and useful Improvements in Cigar-Banding Machines, of which the following is a specification.

The present invention, which relates to cigar banding machines, comprises improvements on the machine of my Patent No. 1,292,409, dated January 21, 1919.

My object, generally stated, is to provide improvements on the machine of my Patent No. 1,292,409 simplifying its construction, increasing its efficiency, adapted to band cigars of all lengths, shapes, and sizes; perfect the timing and accuracy of operation; provide improved folding or wrapping mechanism in unitary form whereby it may be assembled or removed as a unit; make provision for unitary and interchangeable vacuum band retainers and cigar holders for the carrier wheel or drum embodying improvements whereby the special band feeder of my Patent 1,292,409 is entirely dispensed with; provide an improved, adjustable, band holder or hopper, and band supporting means, correlated to the vacuum band retainers and cigar holders in a novel manner whereby the bands are directly taken by suction from the hopper to the cigar holders; improve the operating means for the followers which lay the final lap of the bands; provide improved means for operating the vacuum or suction plungers which take off the bands from the hopper and retain them in the cigar holders, and make provision for improvements in the cigar feeding means, band moistening means and cigar hopper, and various other parts, instrumentalities, and mechanisms of the machine.

My improvements in the band folding or wrapping mechanism comprise, first, the arrangement of the parts on a base plate as a sleeve contained unit which may be applied to, or removed from, the frame of the machine for inspection, repair or adjustment; second, providing a separate spring for the folder and holder so that it does not have to rely on the spring pressure exerted upon it by the tucker, although the spring action on the latter supplements that of the folder and the holder.

My present improvements, relating to the taking off of the cigar band from the band hopper and retaining it on the cigar carrier, embody features and combinations radically different and possessing great advantages over the means employed for that purpose in my patent. I have entirely dispensed with a positively acting band feeder for delivering the bands from the hopper to the cigar carrier. The means shown in my patent for forcing or pressing the band down into the cigar holding pocket of the cigar carrier is entirely dispensed with.

The improved band take-off and retaining means and the cigar holders are constructed in the form of detachable and interchangeable units which may be independently attached to, or removed from, the cigar carrier wheel or drum for the purpose of inspection, attachment or repairs. This feature has many obvious advantages. In lieu of the provision merely of a suction or vacuum duct for retaining the band in the cigar pocket as proposed in my patent, I have, in the present invention, provided a hollow spring actuated vacuum or suction plunger of improved form which is timed to operate to rise and suck down a band from the stack of bands in the band hopper and to hold the band in proper position with its ends lying on the cigar carrier so that the moistener may moisten or gum (if a gummer instead of a moistener be used) the band end which will be finally folded when the cigar has been laid on the band and the tucker, folder and holder have folded the other end of the band. Provision is made for equalization of the vacuum on the plunger to overcome possibility of any sticking of the plunger; this improvement comprises an annular channel or reduced portion on the plunger. The cam which actuates and times the respective vacuum plungers is so arranged that each plunger rises, takes off a band from the stack in the hopper, retreats, dwells to hold the band with its ends overlapped so that moistening or gumming may be effected, and finally causes the plunger to completely retreat so that the band will be fully drawn down into the cigar holding pocket, after moistening and the band retarded there so that the cigar may be fed into the holder and onto the band, and the folding operations subsequently carried on.

My present improvements embody, in part, a band holding hopper, adjustably arranged and supported so that it may be positioned to dispose the stack of bands in such relation to the cigar carrier that the suction or vacuum plungers may take off, by suction alone, the band at the bottom of the stack, thus dispensing entirely with any positive band feeding means such as proposed in my patent. A timed supporter holds the stack of bands except when the suction plunger is taking off the lower band.

The improvements for operating the followers which lay down the final or overlapped end of the band and hold the banded cigars in their pockets, comprise an oscillatory cam, and a flying lever which is operated by a cam on the master shaft, such mechanism operating with positiveness and accuracy.

The improvements in the cigar hopper and feeding means comprise, first, an adjustable side or sides for the hopper whereby adjustment may be made to accommodate cigars of different lengths, insuring their accurate advance in the hopper by the apron and preventing them from getting twisted during their advance and feed; second, adjustable guards which are arranged between the rocking gate and the feed chute and are disposed over the endless apron in the hopper, said guards preventing the cigars from rising up or punching should there be any undue back pressure; the guards are arranged so that they may be spread laterally in relation to each other, according to the width to which the hopper is adjusted.

The cut-off and means for defining the chute for the passage of the cigars from the hopper to the cigar carrier embody elements which are adjustable to compensate for the adaptability of the adjustment of the hopper sides and the sizes of the cigars.

The moistener embodies certain detail improvements, which simplify it and they comprise a self-contained attachable and detachable structure and removable fluid receptacle.

Other features of the invention will appear more fully hereinafter.

The invention being susceptible of modifications in various respects without departing from its essential practice, the disclosure hereinafter given is to be considered illustrative, rather than restrictive, of the scope of the invention.

In the accompanying drawings,

Figure 1 is a plan view;

Figs. 2 and 3 are opposite side elevations;

Fig. 5 is a detail longitudinal section showing certain of the parts and mechanical movements, a portion of the cigar carrier or drum being shown in final banding position, before the presser finger has descended, the cut-off or gate for the cigars being closed;

Fig. 6 is a similar view taken on another plane, showing a part of the cigar carrier and the band folding or wrapping mechanisms and also the cams and levers which control the operation of the latter;

Fig. 7 is a detail plan view of the delivery end of the cigar feeder and cut-off;

Fig. 8 is a vertical section on line 8—8 of Fig. 7;

Fig. 9 is a detail side elevation partly in section of one of the improved unitary cigar holders and its vacuum or suction band holder, plunger and follower;

Fig. 10 is a detail side elevation looking toward the opposite side thereof;

Fig. 11 is a detail perspective of the improved unitary band folding or wrapping mechanism;

Figure 17:
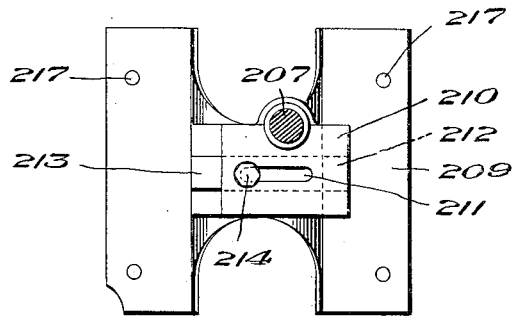
Figure 12:
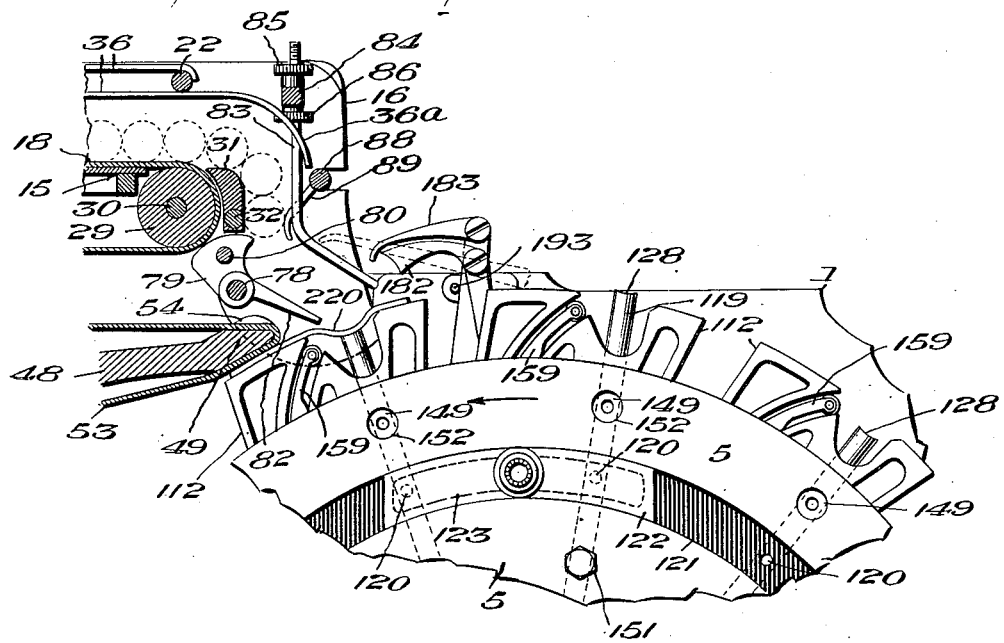
Figure 16:
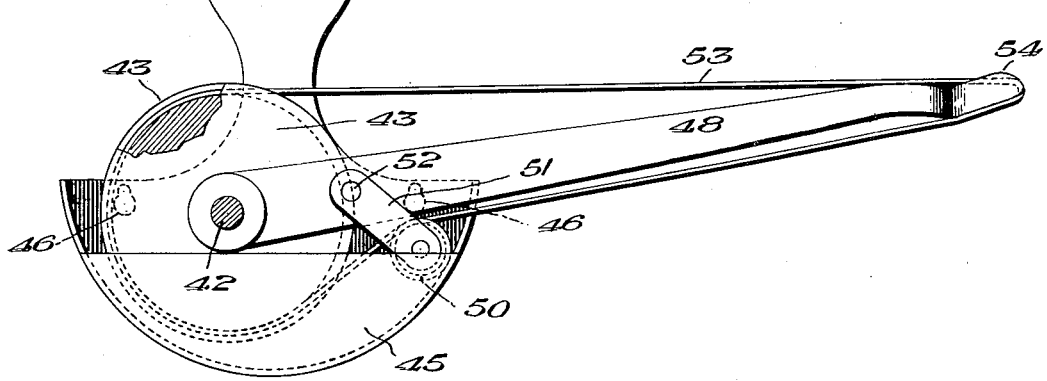

Fig. 12 is a detail elevation, partly in section, showing a part of the cigar carrier and of the moistener and cigar feeder, one of the vacuum plungers being almost fully elevated to take a band from the hopper, and the preceding cigar holder which has taken a band and is in cigar receiving position, being partly retracted, the moistener being applied to the advance end of the band, the feed of the cigars being cut off, and the folding or wrapping mechanism and presser finger being in normal, or raised, position;

Fig. 13 is a detail side elevation, partly in section, of the cigar carrier, band hopper, moistener, and cigar feeder, the vacuum or suction plunger having been previously raised to its full limit to cause a band to adhere thereto, and partially descended to pull down the band and allow the band supporting device to support the remaining bands; the preceding vacuum or suction plunger having completely descended and drawn the previously moistened band down from the position shown in Fig. 12, the moistener having risen, and the parts being in readiness for the release of the lowermost cigar from the feeder so that it will fall into the holder and rest on the band, in the manner shown in Fig. 14;

Fig. 14 is a view like Fig. 13, the band taken from the bottom of the stack, having been partly drawn down onto the cigar holder; the vacuum or suction plunger of the preceding cigar holder having drawn the moistened band fully downward, the presser finger having descended and holding the previously fed cigar in the holder, the feed of the cigars being cut off, the moistener having fully risen, the follower having risen to a position where it will be ready to follow the folding or wrapping mechanism when it retreats, and the folding or wrapping mechanism having started its advance;

Fig. 15 is a detail, fragmentary, view of the lower portion of the cigar carrier, representing the carrying of the banded cigar and its finally dropping from the cigar carrier onto the take-off or carrier;

Fig. 16 is a detail side elevation of the moistener;

Fig. 17 is a detail view of the band hopper;

Fig. 18 is a detail showing a take-off or delivery mechanism which may be used to remove the banded cigars.

The operative parts are supported by a frame 1. The shaft 2 is the master shaft which initiates the operation of the various mechanisms and, mainly, controls the timing thereof, although certain mechanisms are timed by the countershaft 3, the latter being connected by gears 4 to the shaft 2. The cigar carrier or drum 5 is secured to a shaft 6 and is turned with a step by step movement from shaft 2 by a Geneva stop movement comprising the wrist wheel 7 on shaft 2 and the stop wheel 8 on shaft 6. The cigar carrier is turned one step during each rotation of the shaft 2. To lock the cigar carrier in its different positions, as it turns in a step by step manner, there is provided a pivoted latching lever 9 having a locking pin and roller 10 adapted to enter the interdental spaces between the teeth of the stop wheel to lock the latter or, to ride on the periphery of the stop wheel. A spring 11 presses the locking lever against the stop wheel; the lever is limited in its movement by a stop 12 on the frame 1. A pin and roller 13 carried by the wrist wheel 7 serve to retract the latching lever 9 just prior to the engagement of the wrist pin 14 with a notch in the stop wheel 8 and, immediately the wrist pin 14 passes out of the notch in the stop wheel, the locking pin and roller 10 enter the notch and lock the stop wheel.

The hopper which contains the cigars to be banded comprises a bottom 15 and sides 16 and 17, one or both of which may be laterally adjustable. I have shown the side 17 as adjustable in relation to the side 16 for the purpose of accommodating cigars of different lengths to thereby insure their parallelism as they travel over the hopper bottom 15 while resting on the endless apron 18 which has one stretch traveling over said bottom. By providing relative adjustability of the sides 16, 17, the hopper can be quickly and easily set according to the length of cigar being run through the machine. This adjustability prevents any disengagement of the cigars from a position crosswise of the hopper and the apron 18 and prevents them from clogging or bunching, regardless of the length of the cigar.

Brackets or frame pieces 19 are secured to the rear end of the frame of the hopper bottom, and brackets or frame pieces 20 connect the front end of the hopper bottom frame to the main frame 1. The sides 16 and 17 are supported on a rod 21 connecting the rear brackets 19, rods 22 connected to brackets 20, constituting a support for the front ends of the hopper sides, the latter being extended downwardly, between the front brackets 20, on opposite sides of the carrier wheel or drum 5 to form the ends of a chute down which the cigars pass as they are delivered to the cigar carrier (Figs. 6, 7, 8, 12, 13). The side 16, if it is intended for the same to be non-adjustable, is secured by nuts 23 on the rod 21 at its rear end and by screws 24 to the rods 22 at its front end. If it is desired to have the side 16 adjustable, the rod 21 may be fixed to the brackets 19 and the side 16 held by a screw to the rod 21, just as the screws 24 hold said side to the rods 22.

The side 17 is adjustable toward or away from the side 16 by virtue of it being slidably mounted on the rods 21 and 22 and it may be set at any point by tightening the screw 25 at the rear end of the side and the screws 26 which fasten the front ends of the side 17 to the rods 22. The apron 18 is only of a width sufficient to properly carry the cigars of whatever length, along the top of the hopper bottom and, consequently, the side 17 may be adjusted to accommodate the shortest cigar which is to be banded without interference between the lower edge of said side and the apron 18.

The apron 18 runs around a driving or feed drum 27 on a shaft 28 journaled in brackets 19 at its rear end, and around an idler drum 29 carried by shaft 30 journaled in the brackets 20. A piece 31 carried by a rod 32 secured to the bracket 20 is located at the inner end of the apron 18 adjacent the drum 29; the cigars, when leaving the apron, pass over the face of this piece and downwardly between the vertical extension of the sides 16 and 17.

The lower stretch of the apron 18 runs over an idler drum 33 carried by a frame 34 hinged at 35 to the hopper bottom by bolts and nuts which can be tightened to hold the frame where adjusted, so that any desired tension may be placed on the lower stretch of the apron.

To prevent the cigars from clogging or bunching when they arrive at the inner end portion of the hopper and apron, there are provided a plurality of adjustable bars 36 (Figs. 6, 7, 8, 12, 13 and 14) comprising strips and clamps extending longitudinally over the apron and held together by screws and nuts 37 whereby they are clamped, in parallel relation, to the rods 22. On loosening the clamps, the guards may be slid along the rods 22 to another position and spaced as near together or as far apart as may be desired to properly hold down the cigars, whatever their length, so that they will be delivered from the end of the apron, as shown in Figs. 12, 13, 14. The rear end of the guards are curved upwardly to facilitate the cigars entering beneath them, and their inner ends are curved downwardly as shown at 36ª to define the upper part of the chute down which the cigars pass to the carrier 5.

A shaft 38 journaled in the side 16 and prevented from sliding therethrough by nut and collar, is also loosely journaled in the side 17 to permit the latter to be slid therealong. A gate 39 is carried by the shaft 38. The shaft 38 has a crank 40 by which it is operated as set forth hereinafter.

Journaled in a hanger 41 depending from the hopper bottom is a shaft 42 which carries a sheave 43 forming a part of the moistener. A bracket 44 secured to the bottom of the hopper, serves as a support for a detachable trough or cup 45 which receives the sheave 43 and is provided with key-hole slots 46 to engage studs or screws 47 on the bracket 44 (Figs. 3 and 16). The cup, which is adapted to hold water, or a fluid adhesive, according to whether the cigar bands are gummed or plain. The detachable connection provided enables the cup to be quickly and easily removed for cleansing or refilling. Loosely mounted on the shaft 42 is the arm 48 of the moistener (Figs. 2, 3, 6, 12, 13, 16). The end 49 of the arm is shaped to correspond with the outer faces of the detachable and interchangeable cigar holding devices carried by the carrier 5 so that moistening or gumming of the cigar bands may be effected at the proper time (Figs. 12, 13, 14). An idler 50 carried by a frame 51 which is hinged at 52 to the arm and may be locked by tightening its point of connection thereto, is arranged in line with the sheave 43. An endless tape or band 53 passes around the sheave, idler, and end 49; flanges 54 on the end 49 preventing the band from slipping off of said end. A ratchet wheel 55 is secured to the shaft 42. An arm 56 is secured to the hub of the moistening arm 48 which is normally pulled upwardly by a spring 57 secured to the hopper bottom 15.

Secured to the shaft 28 is a ratchet wheel 58. Loose on the shaft 28 is an arm 59. Loose on the shaft 42 is an arm 60. The arms 59 and 60 are connected by a rod 61 which is pivoted to the respective arms. Pawl carriers 62 and 63, provided with slots, and straddling the rod 61, are adjustably connected thereto for adjustment along said rod by screws 64 passing through the slots and into the rod 61. Respective pawls 65 and 66 are pivoted to the pawl carriers 62, 63, and respectively engage the ratchet wheels 58 and 55. By adjusting the pawl carriers 62 to different points on the connecting rod 61, any desired cooperation of the pawls with the ratchet wheels may be had and any desired turning of the feed drum 27 and sheave 43 may be obtained.

Pivoted at 67 to the frame 1 is a vertically arranged rocker 68 with the lower end of which the connecting rod 61 has a slot and bolt connection 69, permitting any desired adjustment and stroke. A connecting rod 70 forms an operative connection between the upper end of the rocker 68 and the link 40 whereby the gate 39 is rocked in the direction of the advance of the cigars when the apron is advancing and the tape 53 is moving. The rocker 68 is oscillated by a gear $4^a$ on shaft 3, through the intervention of a connecting rod 71 which has an adjustable slot and bolt connection 72 with the upper end of the rocker. The moistener arm 48 is pulled downwardly in opposition to the retracting action of the spring 57 by a slide rod 73 pivoted at 74 to the arm 56 and held by a relatively strong spring 75 in contact with a cam 76 on shaft 2. The rod 73 slides against rollers 77 on frame 1. The spring 75 being stronger than spring 57, the moistener arm 48 is pulled downwardly when the position of the cam 76 permits such action. The cam also raises the moistener arm and is assisted by the spring 57 in that function (Figs. 1, 2, 5).

Journaled in the frame 1 and the parts 20 are shaft sections 78 which carry the gate members 79 which constitute the rear part of the chute down which the cigars pass when said gate sections are in position for the cigars to feed and which serve as a cut-off to hold back the cigars at other times (Figs. 5, 6, 7, 8, 12, 13, 14). These gate sections are connected by a short rod 80 which is disposed above the shaft sections 78 so that there will be no interference with the rise of the moistener arm 48 which is adapted to move upwardly between said gate sections, as shown in Fig. 14. The rounded heads 81 of the gate sections serve as a cut off for the cigars and turn just under the piece 31. The fingers 82 of the gate sections, which are relatively wide as shown in Fig. 7, collectively constitute a chute down which a cigar may roll when the shaft 78 and the gate sections are rocked backwardly. The piece 31 and the inner depending ends of the hopper sides 16, in connection with the fingers 82 constitute the back, sides and bottom of the chute down which the cigars may roll from the apron 18. To prevent the cigars from falling forwardly and to constitute the front of the chute, there are provided vertical rods 83 which are carried by a bar 84 which is secured to the frame pieces 20. The rods or wires 83 pass through holes in the bar 84 and are provided with screw threads and are held by nuts 85 and 86 above and below the bar. By this means the rods or wires may be adjusted upwardly and downwardly so that the bent lower portions 87 of the rods may be adjusted to insure the accurate delivery of the cigars to the cigar holder of the carrier 5 which is in position to receive a cigar to be banded. The bent portions 87, as shown in Fig. 7, constitute the front of the chute down which the cigars pass to the carrier 5.

A rock shaft 88 which is journaled in the side pieces 20, carries gate finger cut offs 89 which assist in checking the feed of the cigars (Figs. 5, 6, 12, 13, 14) and which move out of the way to allow the cigar to drop, at the proper time. Secured to one of the sections of the shaft 78 is an arm 90 which has a yoke 91 provided with a cross pin 92 and is provided with a stop 93 adapted to be arrested by a stop 94 on the inner side of the frame piece 20. A spring 95 connected to the stop 93 exerts tension on arm 90 and tends to rock shaft 78 to cause the fingers 82 of the gate cut off to extend across the slot or chute down which the cigars feed (Fig. 5). Referring to Fig. 5, a slide bar 96, which is adapted to be forced rearwardly by a cam 97 on shaft 3, slides between idlers 98. This bar has a slot 99 which straddles the pin 92, allowing a certain lost motion in the connection between the bar 96 and the arm 90. A spring 100 connected to the bar 96 and to the frame 1, constantly tends to draw the bar 96 to the left of Fig. 5 and to hold it in position for actuation by the cam 97 or against said cam, as the case may be, according to the extent to which the shaft 30 is rotated. A cam 101 is adjustably secured to the bar 96 by a screw and slot connection 102 whereby it may be adjusted. This cam abuts the upper idler 98 and arrests the movement of the rod 96 toward the left when the rod is in its extreme position.

Adjustably secured to the rock shaft 88 by a screw 103 is a rod or wire 104 which bears against a pin 105 projecting laterally from the bar 96. A spring 106 connected to bar 96 and to the rod 104, holds the rod against the pin 105. Consequently when the bar 96 moves toward the left, Fig. 5, to rock the gate 79—82 to free the cigar so that it may fall, the shaft 88 is rocked and the fingers 89 rocked toward the left, thus opening the passage for the cigars to fall.

A presser finger 107, Figs. 1 and 5, is pivoted at 108 on a bracket 109 which is secured at 110 to the frame 1. This presser finger has its outer end drawn down by a spring 111 into engagement with the cam 101. Consequently, when the bar 96 moves to the left of Fig. 5, the presser finger is released from cam 101 and then rises but, when the bar 96 is moved to the right of Fig. 5 to a sufficient extent for the mechanisms to open the gate sections 79—82 and 89, the cam 101 commences to engage the presser finger and to force its operative end shown at the right, Fig. 5, down onto the cigar to hold it on the band so that the folding and wrapping mechanism and follower may start and complete their operations. The cam 97 is formed to form a dwell of the bar 96 and to the end of the presser finger 107 on the cam 101 for a sufficient period to enable the foregoing operations to be carried on while the cigar is held by the presser finger.

The detachable, self-contained, and interchangeable band and cigar holders are shown separate in Figs. 9 and 10 which represent opposite side views. In Figs. 2, 3, 12, 13, 14, 15, these band and cigar holders are shown attached to and carried by the carrier wheel or drum 5. As the band and cigar holders of Figs. 9 and 10 are duplicated all the way around the carrier wheel 5 the following specific description is to be understood as applying to all of them. That face of the band and cigar holders which lies next the face of the carrier wheel 5, is shown in Fig. 9; Fig. 10 shows the outer face of the band and cigar holder. The body is in the form of a casting 112 which may be hollowed out at 113 to lighten it. The cigar holding pocket 114 is of a size adapting it to receive cigars of any of the usual sizes. Opening out through the lowermost portion of the face of the pocket 114 is the mouth 115 of a bore 116 which runs lengthwise inside the stem 117. A port 118 on the inner face of the casting 112 joins the bore 116 and affords means for placing the hollow plunger 119 in communication with the source of vacuum or suction. The carrier wheel 5 has a plurality of ports 120, one registering with each of the ports 118. The carrier 5 has an annular channel 121 through which the ports 120 communicate. An arc-shaped shoe 122 lies in the annular channel 121 and is provided with a hollow or channeled face 123 opposed to the bottom of the channel 121. The hollowed face 123 is of sufficient length to bridge the space between two of the ports 120 so that, first, the plunger 119, which is approaching the position where it is to take off a band, will be subject to vacuum just before it is positioned by the rotation of the carrier wheel 5, at the point where the band should be partly pulled down into the pocket 115; second, for the purpose of supplying vacuum to the preceding plunger 119 until the band has been wrapped around the cigar and the follower is actuated to hold the wrapped or banded cigar in its pocket. The foregoing operations will be apparent from Figs. 12, 13 and 14.

The shoe 122 is carried on the end of a hollow stem 124 which is slidably and rotatably mounted in a bracket 125 carried by frame 1 and said shoe is held in the channel 121 by a spring 126. The mounting of the shoe causes it to automatically conform to the channel 121 as the carrier 5 rotates.

Referring again to Figs. 9 and 10, the hollow interior or port 127 extends longitudinally through the plunger 119 from its upper concaved end 128 to the shoulder 129. The plunger 119 is provided with a shoulder 130. Between the shoulders 129 and 130, the plunger is reduced in size as shown at 131 so that an annular channel 132 surrounds it between the said reduced portion and the bore of the hollow stem 117. In the face of the plunger is a longitudinally extending groove 133 which opens into the bore 127. The improvements just described insure an even distribution of the vacuum or suction on all sides of the plunger 119 when the latter has risen to a point where the reduced portion 131 comes opposite the suction port 118 as when the plunger has been elevated to draw down a band. By the provision of the equalizing channel or annular space 132, any lateral drawing of the plunger or the bore in the stem 117 due to the vacuum, is prevented and any tendency towards sticking of the plunger is thereby prevented. A collar 134 rests against the shoulder 130 and a coiled spring 135 surrounds the plunger between the said collar and another collar 136. The plunger 119 has a wheel or roller 137 which travels on a cam 138, Figs. 2 and 13, which is fixed to a sleeve 139 loosely mounted on the shaft 6. The shaft 2 carries a cam 140, Figs. 1, 4, and 5, which cooperates with a slidable bar 141 guided by idlers 142 and connected at 143 to a crank 144, which is secured to the hub 145 of the cam 138. The cam 138, its hub 145, and the arm 144 are, in effect, integral so that the cam 140 causes rocking of the cam 138 in a clockwise direction, Figs. 2 and 13, by which the plungers 119 (Fig. 13) beginning shortly after the dwell portion 146 has been passed after the dropping of the banded cigar (Fig. 15), begin to rise on the profile of the cam and are gradually projected until they finally ride up on the apex 147, take hold of a band by suction, and then abruptly descend to the step 148, there to remain as shown in Figs. 13 and 14 with the band partly drawn down into the pocket 114 until, on further turning of the carrier 5, the cigar holder, which has received the band, has arrived in cigar receiving position whereupon, on further turning of the cam 138, the plunger drops from the position shown in Fig. 12 to that shown in Figs. 13 and 14, the plunger then having dropped onto the dwell 146.

Figure 4:
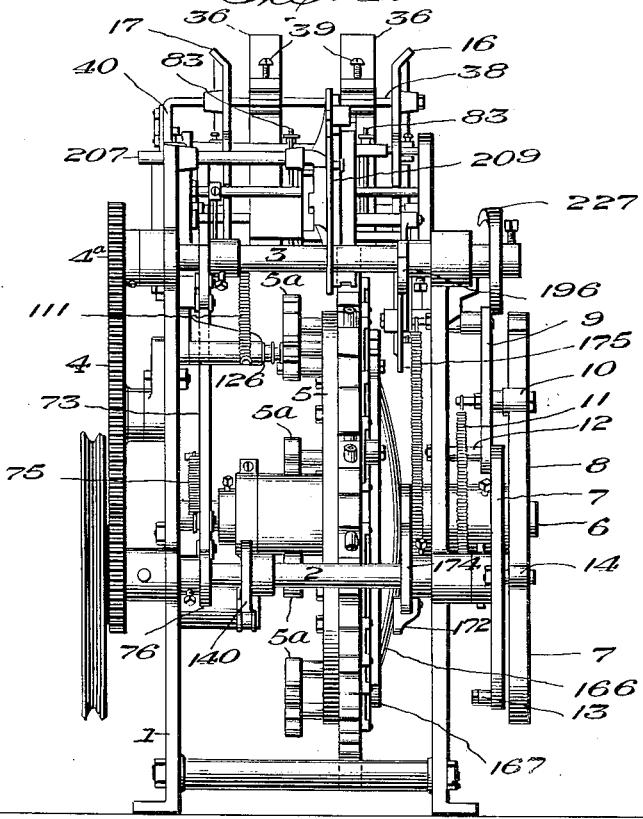
Fig. 4 is an end elevation.

Referring again to Figs. 9 and 10, the casting 112 has bosses 149, 150 which are adapted to fit into corresponding holes extending through the carrier wheel 5. Lag screws 151 have their shanks engaged with the bosses 150 and their heads bearing on the carrier wheel 5. The holes which receive the bosses 149 are shown in Figs. 12, 13, 14, at 152. Referring to Figs. 1, 2, 4, there are cigar holders or brackets 5ª, corresponding in number to the cigar holders of Figs. 9 and 10 and of general Y-shape. Through these cigar holders 5ª pass lag screws 153 which have their heads bearing on the holders 5ª and their screw headed shanks screwed into the internal screw threaded bosses 149, thereby clamping the holders 5ª in position and also securing the outer end portions of the castings 112 to the carrier wheel 5. The fact that the holders 5ª are loosely mounted on the lag screws 153, enables said holders 5ª to be turned to bring their crotches in alignment with the notches or holders 114 of the castings 112. In each instance the holders 114 and the holders 5ª support the cigar at different points of its length so that it will not become displaced and to enable the cigar to readily fall into the correct position, on the band previously drawn down into the pocket 114 when passing from the apron 119.

The cigar holders, plungers and followers of Figs. 9 and 10, being duplicated all around the carrier wheel, they are detachable and interchangeable and any one of them may be removed by simply unscrewing the lag screws 151 and 153, and another unit substituted without interfering with any of the other, similar, units. This feature minimizes expense of repairs and loss of time from stoppage of the machine should any one of the band holding and cigar holding units get out of order or require replacement. The provision of the vacuum or suction plungers 119 which positively rise and take off a band and hold it in the cigar holding pocket 114, eliminates the means employed in my Patent No. 1,392,409 for specially feeding a band to the pocket and then pressing it into the pocket before it is subject to vacuum. My improved suction plunger insures accurate and positive removal of the band from the stack in the band hopper and its accurate placing in the pocket 114. The operations of taking off the band and placing it in the pocket being conducted by the plunger alone, a great increase in speed, efficiency and output is obtained over the mechanisms employed for feeding the band, placing it in the pocket and holding it there, in my patent aforesaid.

Pivoted on a suitable lag screw 154 to the casting 112 is a bell crank 155 which is retracted by a spring 156 secured at 157 to the stem 117. Secured to the other arm of the bell crank 155, is a screw 158 which is fastened by a nut. Said screw constitutes a pivot for a follower 159 which has a roller at its outer end where it is adapted to roll down the final end of the band that is to be folded. The follower 159 has a lateral shoulder 160. The casing 112 is provided with an arc-shaped slot 161 in which the follower 159 is normally housed, said slot opening through the side of the notch 114. When the follower is projected to lay down the final end of the band, its roller finally engages a beveled surface 162. The follower being narrower than the slot 161, the laterally engaged projection 160 slides on a wall of the slot 161 and prevents the follower from falling down, when it is projected, and thus affords freedom of movement without danger of the follower digging into the cigar and injuring it. The spring 163 which is coiled around the screw 158 and engaged with the follower, presses the follower downwardly so that the lug or projection 160 is constantly in contact with the wall of the slot 161. Consequently all wobbling of the follower is prevented and yet the follower exerts a yieldable pressure on the band and on the cigar which prevents any injury to them. The bell crank 155 has a stud or screw 164 to which the spring 156 is connected and which also carries a roller 165.

Loosely mounted on the shaft 6 is a large disk 166, Figs. 1, 4 and 15. This disk is provided with a periphery comprising two semicircular parts, one-half of the periphery 167 being in the arc of a circle of less diameter than the other half 168. The two portions 167, 168, are connected by abrupt cam inclines 169, one being located at the lower portion of the disk 166 (Fig. 15), and the other being located at the upper portion of the disk and not appearing. The rollers 165 of the respective followers bear on the periphery of the disk 166 and are held thereagainst by the springs 156, Fig. 10. The uppermost cam incline 169 is so positioned that immediately the first end of the band has been folded down, and the folding or wrapping mechanism has started to retreat, the roller 165 rides up the incline 169, passing from the peripheral portion 167 on to the peripheral portion 168. The rise of the roller causes the bell crank lever 155 to turn and the follower 159 to immediately advance from its slot 161 to fold down the second, or overlying end of the band. The follower remains in that position, as shown in Figs. 2, 3, 13, 15, until the cigar arrives in discharging position, Fig. 15, whereupon the roller 165 reaches the lower cam incline 169 and drops down onto the peripheral portion 167. The follower 159 then retreats into its slot 161 and the banded cigar falls out onto a take-off described hereinafter.

The disk 166 carries, on a suitable pivot 171, a lever 172 which is provided with an adjusting screw 173 adapted to bear on the hub of disk 166 to serve as a stop for the lever 172. A cam 174 on shaft 2 is adapted to actuate the lever 172 at proper times, as shown in Fig. 6. A spring 175 connects the pivot 171 with the lever of the frame 1. This spring tends to turn the disk 166 and to hold the lever 172 in contact with cam 174. The turning of the disk 166 by the depressing of the right hand end of the flying lever 172, Fig. 6, occurs at the proper time to cause the follower 159 to lay down the final end of the band and the lowermost follower 159 to retreat to carry on the respective operations of finishing the banding and releasing the banded cigars.

The band folding or wrapping mechanism, in its construction and essential principles, is somewhat similar to the corresponding mechanism in my Patent No. 1,292,409, but certain improvements have been made. As shown in Fig. 11 the mechanism is constructed and arranged as a self contained attachable and detachable unit which may be applied to or removed from the frame 1. The operative parts of the band folding or wrapping mechanism are carried by a base or plate 176 which is secured by lag screws 177 (Fig. 3) entering screw threaded holes 178 in the plate 176. A pivot stud or screw 179, screwed into the base 176, affords a bearing for the arms 180 and 181 which carry the folder and holder 182 and the tucker 183. The folder and holder 182 is formed integral with a sleeve 184 and a tail or dog 185 which is adapted to be brought into engagement with a lug or stop 186 on plate 176 on the return movement of the mechanism. A spring 187 cooperating with the folder and holder 182, and with the pin or screw 188 carried by the arm 180 and on which the folder and holder, sleeve 184 and tail 185 are mounted, tends to press the folder and holder downwardly. The arm 189 is mounted on the pin or screw 179 and carries a pin or screw 190 on which the tucker 183 and its integral sleeve 191, are loosely mounted. A spring 192 cooperating with the tucker and with the pin or screw 190, holds the tucker down on the folder and holder 182. The folder and holder 182 and the tucker 183 being each spring actuated the folder and holder 182 is not dependent for its downward pressure on the action of the spring 192. The spring 192 supplements the action of the spring 187 on the folder and holder 182. At the same time, the spring 192 causes the tucker 183 to be pressed downwardly onto the folder and holder.

The arm 189 is provided with a stop 193, Figs. 6, 12, 13, 14, which engages the edge of the arm 180 and arrests it so that the folder and holder 182 cannot move beyond the tip of the tucker 183, but this permits the tucker 183 to advance beyond the end of the folder and holder when finishing the laying down of the first end of the band. On the return of the parts, the tail 185 engages the stop or pillar and tilts the folder and holder 182 and tucker 183 upwardly so that they will clear the peripheries of the cigar holders. A spring 194 connected to a rod 195 and to the arm 180, tends to force the arms 180 and 189 toward folding position.

On the shaft 3 (Fig. 6) is a cam 196 against which bears the end of an operating rod 197 which is pulled by a spring 198 one of whose ends is secured to the rod at 199, the other end being secured to the frame 1 at 200. This rod is connected to the arm 189 by a pin or screw 201 fastened in the opening 202, Fig. 11. The rod 197 is preferably provided with an adjustable section 203 by which the limits of travel of the folding mechanism previously described may be determined. The rod 197 is slidable against idlers 204 on the frame 1.

Adjustably mounted on the frame 1 at 205, Fig. 2, is a bracket 206 which carries the rotatable and slidable stem 207 of the band hopper (Figs. 1, 2, 4, 17). This stem 207 is held by a set screw 208. Consequently the hopper 209 can be rocked or slid crosswise of the machine to bring it in the desired position for the bands to be taken off by the plungers 119. The stem 207 carries a plate 210 which is provided with a slot 211 having a channel 212 in its face. The hopper 209 has a tongue 213 which is slidable within the channel 212. A lag screw 214 passing through the slot 211 and into the tongue 213, affords means whereby the hopper may be clamped in any position to which it may be slid laterally in relation to the stem 207. The guides 215 which constitute the sides of the hopper, are provided with slots 216 in which are clamping screws 217, Figs. 3 and 17, said screws entering the hopper proper. The sides 215 are thereby made adjustable in relation to each other so that bands of different lengths may be accommodated. The lower portions of the guides 215 are provided with inwardly projecting points 218, Fig. 14.

The stack of bands is shown at 219. The band which has been taken off from the stack is shown at 220.

To support the stack of bands and prevent it from being pulled down by the suction, when the plunger 119 rises to take off the lowermost band, there is provided a band supporter 221 which has a pointed end as shown in Fig. 1 to facilitate positioning the cut off below the stack. The band cut off 221 is slidable in a guide 222 which is carried by a bracket 223, Fig. 6, having a slot 224 and having a tongue and groove connection 225 with a plate 226 which is screwed to the frame 1. This construction permits the bracket 223, guide 222 and cut off 221 to be adjusted laterally so that the cut off may be properly positioned.

Carried by the shaft 3 is a cam 227, Figs. 1, 3, 4 and 6. A lever 228 pivoted to the frame 1 at 229, is pivoted at 230 to the cut off 221 and its other end cooperates with the cam 227. A spring, not shown, whose end is connected to the pivot 230, as shown in Fig. 3, is also connected to the guide 222. This spring holds the lever 228 in contact with the cam 227 and tends to project the band cut off 221 underneath the stack of bands.

General operation: The machine having been adjusted to band the size and length of cigar which it is to handle, the cigars are fed forward by the apron 18 and are held by the gate members 79 and 89 until such time as the lowermost cigar of the series should be released. The step by step rotation of the cigar carrier 5 brings the plungers 119 successively into position where the ports 118 are subject to vacuum derived from the channel 123 which, in turn, is subject to vacuum obtained from any suitable source through the stem 124. As the carrier turns, the plungers 119 are gradually elevated until they finally reach the apex 147 of the cam 138 at which time the upper end 128 of the plunger is in position to draw down the lowermost band of the stack 219. On the retreat or descent of the plunger 119 through the action of its spring 135 when the plunger drops from the apex 147 to the step 148 of the cam 138, the band 220 is drawn down slightly by the suction into the pocket 114 of the cigar holder. The ends of the band 220 then lie on the outer face of the casting 112. The plunger and the band remain in this partially drawn down or retracted position until the disk carrier 5 has moved to bring the disk holder into the cigar receiving position. The parts are so timed that the moistener arm 48 descends, as shown in Fig. 12, and either moistener or gum is applied to the advance end of the band. While the carrier remains in the same position, further operation of the mechanisms cause the moistener arm 48 to rise and the plunger, shown at the left of Fig. 12, to fully descend because it passes from the step 148 of the cam 138 onto the dwell 146 of said cam. The band 220 is thus sucked or drawn down into the pocket 114 as shown in Fig. 13. The gate sections 79 and 89 now open and the lowermost cigar falls down into the pocket 114 and holder 5ᵃ. Continuance of the operations causes the cut off 89 to hold back the remainder of the cigars. The presser 107 descends and holds the cigar firmly and remains in its holding position. The folder and holder 182 and tucker 183 now advance as a unit until the folder and holder 182 has pressed down the end of the band onto the cigar. The tucker 183 continues to advance and tucks down the extreme tip of the folded and held end of the band, the operations continuing, the folding mechanism retreats and is followed by the follower 159 which emerges from its slot 161 and folds down the moistened or gummed end of the band on the formerly folded other band end. The follower remains in that position as the carrier 5 continues its rotation, until the lower cam incline 169 is reached, Fig. 15, whereupon the follower retreats and the banded cigar drops out and is carried away by the take off mechanism. Mechanism such as shown in Fig. 18 may be used for this purpose. The banded cigar falls into an open-bottomed trough 231 and onto a table 232. A pusher 233, slid back and forth on table 232 under the influence of a lever 234 pivoted at 235 and operated by a spring 236 and a cam 237 on shaft 2, delivers the cigars that fall on the table 232 by pushing them therealong.

What I claim is:

1. In a cigar banding machine, a cigar carrier having a plurality of cigar holders each provided with vacuum means adapted for taking a band from a source of band supply and retaining the band for the subsequent banding of a cigar.

2. In a cigar banding machine, a cigar carrier, and a plurality of self-contained interchangeable units deteachably carried thereby, each unit comprising a cigar holder and vacuum means for holding a band in said holder.

3. In a cigar banding machine, a cigar carrier provided with a plurality of duplicate interchangeable self-contained units detachably connected thereto, each unit comprising a cigar holder and a movable vacuum or suction band holding device.

4. In a cigar banding machine, a cigar carrier provided with a plurality of duplicate interchangeable self-contained units comprising a cigar holder, and a vacuum or suction plunger adapted, when projected, to engage a cigar band and, when retracted, to position the band in the holder and retain it there.

5. In a cigar banding machine, a movable cigar carrier, and a plurality of duplicate interchangeable units detachably connected to the carrier, each unit comprising a cigar holder, vacuum means for taking a cigar band from a source of supply and retaining it in the holder, and means for retaining in the holder a cigar to which said cigar band has been applied.

6. In a cigar banding machine, a movable cigar carrier, a plurality of duplicate interchangeable units detachably connected to the carrier, each unit being provided with a cigar holder, a suction or vacuum plunger adapted to engage, position, and hold a cigar band in the holder, and a movable follower adapted to be positioned over the cigar after it has been banded and to retain it in the holder.

7. In a cigar banding machine, a movable cigar carrier, and a plurality of duplicate interchangeable units detachably connected to the carrier, each unit comprising a cigar holder, and a slidable band folder carried by the unit and movable across the holder.

8. In a cigar banding machine, a movable cigar carrier, a plurality of duplicate interchangeable units detachably connected to the carrier, each unit comprising a cigar holder, and a band folding follower carried by said unit and slidable across the holder adapted to finish the folding of the band and thereafter to hold the banded cigar in the holder.

9. In a cigar banding machine, the combination with a cigar carrier adapted for a step by step movement, of a plurality of duplicate interchangeable units detachably carried by said carrier, each unit having a cigar holder, a reciprocable suction plunger adapted to engage a cigar band and position it in the cigar holder, a movable combined band folder and banded cigar holder adapted to first complete the banding of the cigar and then to retain the banded cigar in the holder, and folding means for folding the first end of the band, said folding means, in conjunction with the combined folder and banded cigar retainer, constituting means for completely banding the cigar.

10. A unit for cigar banding machines comprising a body having a cigar holder or pocket, a suction plunger carried by the body adapted to position the band in the pocket, and a banded cigar holder carried by the body.

11. A unit for cigar banding machines comprising a body having a cigar holding pocket and a bore intersecting said pocket, a hollow vacuum plunger operating in said bore and through the pocket, adapted for projection to engage a band and retraction to position the band in the pocket, and means for supplying vacuum to said plunger.

12. A unit for cigar banding machines comprising a body having a cigar holding pocket and a bore intersecting said pocket, a hollow vacuum plunger operating in said bore and through the pocket, adapted for projection to engage a band and retraction to position the band in the pocket, and means for supplying vacuum to said plunger, and a banded cigar holder carried by the body and operable across the pocket.

13. A unit for cigar banding machines comprising a body having a cigar holding pocket and a bore opening out through said pocket, a vacuum plunger operating in said bore and adapted to be projected into the pocket to engage a band and to be retracted to position the band in the pocket, means for supplying vacuum to said plunger, and means whereby the action of the vacuum on the plunger is equalized to prevent the plunger from sticking to the bore.

14. A unit for cigar banding machines comprising a body having a cigar holding pocket and a bore opening out through said pocket, a vacuum plunger operating in said bore and adapted to be projected into the pocket to engage a band and to be retracted to position the band in the pocket, means for supplying vacuum to said plunger consisting of a port opening into the bore, and a reduced open portion on the plunger which communicates with the hollow interior of said plunger whereby the action of the vacuum is equalized around the plunger and the latter is prevented from sticking to the walls of the bore.

15. A unit for a cigar banding machine comprising a body having a cigar holding pocket and guiding surfaces, and a movable follower which is guided by said guiding surfaces and is adapted to be projected across the pocket to hold the banded cigar therein.

16. A unit for cigar banding machines comprising a body having a pocket for holding a cigar, and provided with a guiding surface, and a spring actuated movably mounted cigar follower provided with a projection bearing on said surface, said follower being adapted to be moved across the pocket to hold the banded cigar therein.

17. A unit for cigar banding machines comprising a body having a pocket for holding a cigar and provided with a recess intersecting said pocket, and a follower located in the recess and adapted to be projected therefrom across the pocket, said follower having a projection bearing on a wall of the recess and being spring actuated to hold it against the wall of the recess.

18. A unit for cigar banding machines comprising a body having a pocket for holding a cigar and provided with a recess intersecting said pocket, a follower located in the recess and adapted to be projected therefrom across the pocket, said follower having a projection bearing on a wall of the recess and being spring actuated to hold it against the wall of the recess, and a spring actuated lever pivoted to the body and carrying the cigar holder.

19. In a cigar banding machine, a cigar holder, in combination with a vacuum or suction plunger adapted for engaging a band and positioning it in the holder, and means for supplying vacuum, in an equalized or balanced manner, to said plunger whereby sticking of the plunger is prevented.

20. In a cigar banding machine, the combination with a cigar holder, of a hollow vacuum or suction plunger adapted to engage a band and position it in the holder, said plunger being provided with a portion arranged for the lateral admission of vacuum to its interior at a number of points whereby the vacuum action on the plunger is equalized and it is prevented from sticking.

21. A band folding unit for cigar banding machines comprising a base, arms pivotally mounted thereon, a folder and holder carried by one of the arms, a tucker carried by the other arm, spring means acting on one of the arms, means for causing the arms to travel as a unit in one direction and permitting relative movement in the other direction, and means for tilting the folder and holder and the tucker.

22. An attachable and detachable band folding unit for cigar banding machines comprising a base, arms pivotally mounted on the base, a folder and holder carried by one of the arms, a tucker carried by the other arm, a spring for actuating said arms, means for causing cooperation of the arms when moved in one direction and for permitting relative movement in the other direction, and operating means for collectively moving the arms, said last mentioned means being operable from a moving part of the cigar banding machine.

23. In a cigar banding machine, a movably mounted spring actuated band folder and holder, a movably mounted spring actuated tucker, said tucker and folder and holder bearing one upon the other so that the spring action of one is reinforced by the spring action of the other, and means for moving said folder and holder and tucker.

24. In a cigar banding machine, a pair of pivotally mounted arms, a spring actuated folder and holder carried by one of the arms, a spring actuated tucker carried by the other of the arms which bears on the folder and holder whereby the spring action of the tucker reinforces the spring action of the folder and holder, and means for moving said arms.

25. In a cigar banding machine, a rotary cigar carrier adapted for a step by step movement and having a plurality of cigar holders, in combination with a plurality of vacuum plungers, one for each of the cigar holders, respectively adapted to engage a cigar band and position it in its holder, and means for operating said plungers.

26. In a cigar banding machine, a rotary cigar carrier adapted for a step by step movement and having a plurality of cigar holders, in combination with a plurality of vacuum plungers, one for each of the cigar holders, respectively adapted to engage a cigar band and position it in its holder, a cam with which said plungers cooperate, said cam having a dwell adapted to cause the plungers to remain in retracted position during a portion of the travel of the cigar carrier, and provided with a profile which is adapted to cause the plungers to advance to engage a band, then retreat to hold the band in a position partly in the cigar holder and, finally, to position the band in its final, cigar-receiving location in the holder.

27. In a cigar banding machine, the combination with a rotary cigar carrier having a plurality of cigar holders and adapted for a step by step movement, of vacuum or suction plungers for the respective cigar holders adapted for engaging a cigar band and positioning it within the holder, in each instance, and means for causing said plungers to perform the following cycle of operations: advance to engage the band, partially retreat to hold the band partially located within the cigar holder, with the band ends out-spread for a moistening or gumming operation by other means, and, finally, to fully retreat to locate the band in cigar-receiving position in the holder so that a cigar may be banded by folding means.

28. In a cigar banding machine, the combination with a cigar carrier, of vacuum or suction plungers carried thereby and a band hopper positioned so that the respective plungers may directly take off a band therefrom.

29. In a cigar banding machine, the combination with a rotary cigar carrier adapted for a step by step movement, and plurality of cigar holders carried thereby, of movable followers carried by the carrier adapted to retain the cigars in said holders, and an oscillatory cam from which said followers are operated.

30. In a cigar banding machine, the combination with a rotary cigar carrier adapted for a step by step movement, and plurality of cigar holders carried thereby, of movable followers carried by the carrier adapted to retain the cigars in said holders, an oscillatory cam from which said followers are operated, a flying lever carried by the oscillatory cam, and means for shifting said lever to oscillate the cam at predetermined times to predetermine the advance and retreat of the followers.

31. In a cigar banding machine, the combination with a rotary cigar carrier adapted for a step by step movement, and plurality of cigar holders carried thereby, of movable band end folding followers carried by the carrier, and an oscillatory cam from which said followers are operated.

32. In a cigar banding machine, the combination with a rotary cigar carrier adapted for a step by step movement, and plurality of cigar holders carried thereby, of movable band end folding followers carried by the carrier, an oscillatory cam from which said followers are operated, a flying lever carried by the oscillatory cam, and means for shifting said lever to oscillate the cam at predetermined times to predetermine the advance and retreat of the followers.

33. In a cigar banding machine, a moistener or gummer comprising a pivoted arm, a wheel mounted concentric with the pivotal point of said arm, a tape running over the wheel and said arm, means for turning said wheel, and means for swinging the arm.

34. In a cigar banding machine, a moistener or gummer comprising a swinging arm, a wheel mounted concentrically with the pivotal point of said arm, a tape running over the wheel and over the arm, and a detachably hung cup or trough for the water or adhesive, said cup receiving the wheel, means for swinging the arm and means for turning the wheel.

In testimony whereof I affix my signature.

ISAAC A. HARDY.